(12) United States Patent
Becker et al.

(10) Patent No.: US 8,535,813 B2
(45) Date of Patent: *Sep. 17, 2013

(54) USE OF A METAL COMPOSITE MATERIAL IN A VEHICLE STRUCTURE

(75) Inventors: Jens-Ulrik Becker, Duisburg (DE); Lothar Patberg, Moers (DE); Peter Seyfried, Berlin (DE); Horst Walter Tamler, Witten (DE); Roland Wunderlich, Bergkamen (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/991,001

(22) PCT Filed: Apr. 27, 2009

(86) PCT No.: PCT/EP2009/055053
§ 371 (c)(1),
(2), (4) Date: Jan. 5, 2011

(87) PCT Pub. No.: WO2009/135779
PCT Pub. Date: Nov. 12, 2009

(65) Prior Publication Data
US 2011/0111252 A1    May 12, 2011

(30) Foreign Application Priority Data
May 7, 2008   (DE) .......................... 10 2008 022 709

(51) Int. Cl.
*B32B 15/18*   (2006.01)

(52) U.S. Cl.
USPC .......................................... 428/683; 428/686

(58) Field of Classification Search
None
See application file for complete search history.

(56) References Cited

U.S. PATENT DOCUMENTS

| | | | | |
|---|---|---|---|---|
| 2,002,229 A | * | 5/1935 | Trembour et al. | 29/414 |
| 2,041,519 A | * | 5/1936 | Altgelt | 428/683 |
| 2,093,874 A | * | 9/1937 | Stargardter | 76/104.1 |
| 2,262,885 A | * | 11/1941 | Condo | 428/600 |
| 2,342,104 A | * | 2/1944 | Holt | 148/220 |
| 2,474,682 A | * | 6/1949 | Liebowitz | 428/610 |
| 3,610,290 A | * | 10/1971 | Anderson et al. | 138/143 |
| 3,943,011 A | * | 3/1976 | Dromsky | 428/683 |
| 4,906,305 A | * | 3/1990 | McCormick et al. | 148/522 |

(Continued)

FOREIGN PATENT DOCUMENTS

| | | |
|---|---|---|
| DE | 199 61 948 A1 | 6/2001 |
| DE | 100 11 758 A1 | 9/2001 |

(Continued)

OTHER PUBLICATIONS

Translation of JP 4-191331, Jul. 1992.*

(Continued)

*Primary Examiner* — John J Zimmerman
(74) *Attorney, Agent, or Firm* — Reinhart Boerner Van Deuren P.C.

(57) ABSTRACT

A use of a coilable multi-layer metallic composite material produced by means of roll-cladding in a vehicle structure, in particular a body structure, provides an alternative to monolithic materials. The composite material used in a vehicle structure is a lightweight composite material and comprises three layers of a steel alloy, wherein at least one of the layers is formed from a high-strength or very high-strength steel alloy.

10 Claims, 4 Drawing Sheets

(56) References Cited

U.S. PATENT DOCUMENTS

| | | |
|---|---|---|
| 6,361,883 B1 | 3/2002 | Dilg et al. |
| 6,953,627 B2 | 10/2005 | Junius |
| 2010/0323216 A1* | 12/2010 | Becker et al. ............... 428/624 |
| 2011/0227400 A1* | 9/2011 | Stich et al. ............... 301/63.101 |

FOREIGN PATENT DOCUMENTS

| | | |
|---|---|---|
| DE | 10124594 | 12/2002 |
| DE | 10202212 | 8/2003 |
| DE | 102007022453 A1 * | 11/2008 |
| EP | 0596133 A1 | 5/1994 |
| EP | 1060874 A1 | 12/2000 |
| EP | 1690606 | 8/2006 |
| JP | 58-44812 * | 10/1983 |
| JP | 60-145384 * | 7/1985 |
| JP | 62-97783 * | 5/1987 |
| JP | 3-133630 * | 6/1991 |
| JP | 4-191331 * | 7/1992 |
| JP | 2000-192493 * | 7/2000 |

OTHER PUBLICATIONS

Translation of JP 60-145384, Jul. 1985.*
International Search Report for PCT International Application No. PCT/EP2009/055053, Jul. 2009.

* cited by examiner

US 8,535,813 B2

USE OF A METAL COMPOSITE MATERIAL IN A VEHICLE STRUCTURE

CROSS-REFERENCE TO RELATED APPLICATIONS

This application is a National Phase Application of International Patent Application No. PCT/EP2009/055053 filed on Apr. 27, 2009, which claims the benefit and priority to German Patent Application No. DE 10 2008 022 709.9-21 filed on May 7, 2008, which is owned by the assignee of the instant application. The disclosure of each of these applications is incorporated herein by reference in its entirety.

FIELD OF INVENTION

The invention relates to the use of a coilable multi-layer metallic composite material produced by means of roll cladding, in a motor vehicle structure, in particular a bodywork structure.

BACKGROUND

Materials which are used in motor vehicle structures, in particular bodywork structures, are usually designed with properties which derive from the demands imposed on the materials. Outer skin parts of a vehicle, for example, should have a high strength, in order to guarantee the integrity of the body even under load. At the same time, however, the outer skin parts should have good coating properties, in order, for example, to be able to function as a paint carrier. Further, the material of the outer skin parts must have good deforming behavior in order for the sometimes complex geometric structures of the outer skin parts to be formed without impairment. Optimum realization of all the requirements in one monolithic material is not attainable with the present state of the art. Composite materials, by contrast, are capable, thanks to a suitable composition of materials with different properties, of fulfilling a plurality of functions simultaneously, and thereby at least lessening the disadvantages referred to heretofore.

SUMMARY OF THE INVENTION

In general, the invention is therefore based on an aspect of providing a use of a metallic composite material as an alternative to monolithic materials.

According to the teaching of the present invention, the aspect is achieved in that the composite material is a lightweight composite material and comprises three layers of a steel alloy, wherein at least one of the layers is formed from a high-strength or very high-strength steel alloy.

It has been found that, by a specific design of the composite material, in particular by the selection and composition of certain specific steel grades, such as soft, easily-deformable steel alloys, or high-strength or, respectively, very high-strength steel alloys, a made-to-measure improvement in the technical properties of the composite material can be attained, which composite material is intended for use in motor vehicle structures, in particular bodywork structures and add-on parts, for example in respect of achieving a lightweight construction in comparison with conventional materials.

For example, the middle layer in a three-layer composite is made of a soft, easily-deformable steel alloy, and at least one of the outer layers is made of a high-strength or very high-strength steel alloy. In this way, for example, loads, in particular mechanical loads, which are imposed during the operation of a component manufactured from the composite material, are absorbed by an outer layer, which in terms of material technology is matched to stresses of this kind.

A soft, easily-deformable steel alloy is characterized by the fact, for example, that the yield strength is below 300 MPa, and, at the same time, the elongation at break Ago is more than 20%. A steel alloy of the type DC03 can be regarded as an example of a soft, easily-deformable steel alloy, with a yield strength of 160 MPa and an elongation at break $A_{80}$ of more than 50%. Steel alloys with a yield strength of more than 300 MPa, the elongation at break $A_{80}$ of which is less than 35%, are regarded in particular as high-strength or, respectively, very high-strength steel alloys. As an example of a very high-strength steel alloy, mention may be made of a martensite phase steel according to Standard prEN 10336 HDT1200M, with a yield strength of around 900 MPa and an elongation at break of approx. 5%.

In an advantageous embodiment of the invention, all three layers are formed from steel alloys which differ from one another. In this way, in terms of material technology a composite material can be provided which is asymmetric in respect of the middle layer. It is conceivable for the composite material to be adapted to loads which take effect on the different sides to differing degrees. It is also possible for one of the outer layers to be made from a steel alloy which has a particularly advantageous weldability, for example if the corresponding side is intended for a welded connection to another component.

In addition, the two outer layers may consist of the same high-strength or very high-strength steel alloy. In this specific example, a composite material can be produced which is symmetrical in relation to the middle layer in terms of material technology. This means that the composite material does not have any preferential direction in respect of the material properties, and is particularly versatile in use. In particular, the composite material formed symmetrically in this way behaves during deformation procedures in the manner of a single-layer sheet. This means that the composite material is accessible to devices and processing stages such as are used for single-layer sheets.

In addition, the composite material may have on one side or on both sides a metallic and/or organic coating. By means of a coating, further properties can be lent to the composite material, such as higher corrosion resistance or a pleasing aesthetic exterior. For example, the composite material can be hot-dip galvanized or electro-galvanized. It is also conceivable, however, as an addition or alternative, for aluminum-based coatings and paint coatings to be applied.

In a further advantageous embodiment, the composite material is preferably cold-formed and/or hot-formed. In this way, the composite material can be formed into components such as are used in a motor vehicle structure, in particular a bodywork structure. There are in principle no limits set on the type of deforming technique or the form of the components.

Moreover, the thickness of the middle layer is preferably at the most 90%, but preferably at least 30%, of the total thickness of the composite material. In view of the fact that, for a middle layer, for example of a soft, easily-deformable steel alloy in contrast to outer layers made of high-strength or, respectively, very high-strength steel alloys, use can be made of economic steel alloys, specifying a minimum thickness for the middle layer in relation to the total thickness of the composite material allows for costs savings to be achieved. However, in order to be able to provide good deformability and at the same time good strength properties, the thickness of the middle layer should preferably not exceed 80% of the total thickness of the composite material. The strength values can be adjusted by the selection of the thickness of the layers made of a high-strength or, respectively, very high-strength steel alloy in relation to the other layers.

In particular, it is preferred that the total thickness of the composite material is at most 10.0 mm, preferably in the range from 0.5 mm to 4.0 mm. Depending on the requirements for deformability and strength, a perceptible weight reduction can be attained with the composite material without having to accept shortcomings with regard to the desired strength or deformation properties. The composite material can therefore be used preferably as a lightweight construction material.

An advantageous embodiment of the invention is that the thicknesses of at least two layers, in particular of the outer layers, agree. In this way, a symmetrical structure of the composite material can be achieved with regard to the thicknesses of the individual layers. This symmetry is particularly striking if the outer layers are additionally made of the same steel alloy, such as a high-strength or, respectively, very high-strength steel alloy. The adjustment of a specific thickness of the outer layers can, for example, influence the loading capacity of the corresponding side of the composite material or, if appropriate, also its further processing capacity, such as the welding of the composite material at the corresponding side.

It is particularly preferred if the use is for a B-column, structural components in the force flow, gusset plates, seat rails, locks, hinges, guide elements, components subject to the risk of corrosion with high strength requirements, such as chassis elements, tanks, crash boxes, frame side members, brake disks, or clutches. In these areas of application, the flexibly adjustable or, respectively, combinable properties of the composite material can be put to use particularly advantageously. Especially, by means of outer layers made of a high-strength or, respectively, very high-strength steel alloy, the strength values and deformation properties of the composite material can be largely determined, while by contrast a middle layer made of a soft, easily-deformable steel alloy contributes in particular to the reduction of weight and/or costs.

BRIEF DESCRIPTION OF THE DRAWINGS

There are a number of possible embodiments of the multilayer composite material in accordance with the invention. Reference is made in this connection to the exemplary embodiments in conjunction with the drawings. The drawings show.

DESCRIPTION

Figure 1:
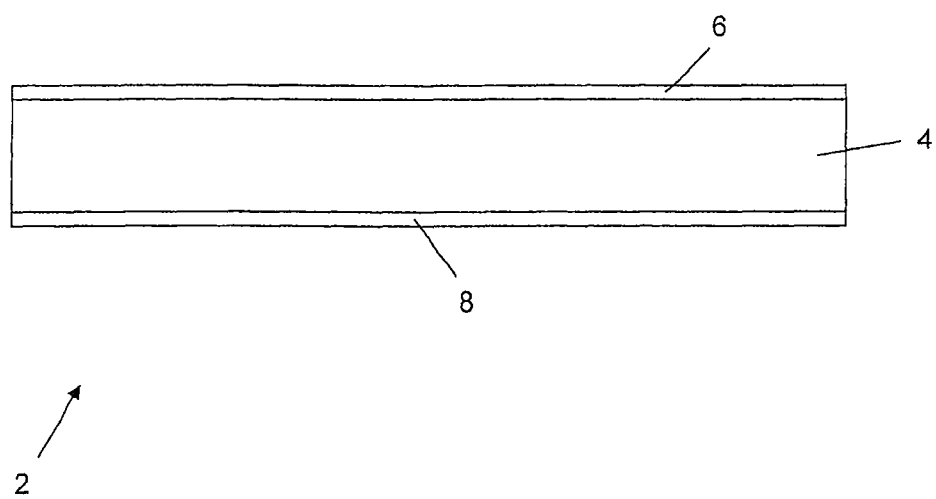
FIG. 1 in a cross-sectional view, a coilable three-layer metallic composite material and FIG. 2*a-c* a plurality of property diagrams of specific steel materials.

FIG. 1 shows a cross-sectional view of an exemplary three-layer composite material 2. In this example it consists of a middle layer 4 made of a soft, easily-deformable steel alloy and two outer layers 6, 8, made of a high-strength or, respectively, very high-strength steel alloy. The two outer layers 6, 8, can be made of the same steel alloy. It is also possible, however, for the outer layers 6, 8, to be made of steel alloys which differ from one another, for example if the degree of loading on the different sides is different using the composite material 2. The thicknesses of the two outer layers 6, 8, in this example are approximately identical. It is likewise possible, however, for the thicknesses of the three layers 4, 6, 8 to vary from one another. The composite material 2 can, in addition, have on one side or on both sides a metallic and/or organic coating (not shown). For example, an aluminum-based coating or paint coating is possible, but hot-dip galvanizing or electrogalvanizing is also conceivable. The composite material 2 can preferably be used for B-columns, structural components in the force flow, gusset plates, seat rails, locks, hinges, guide elements, components subject to the risk of corrosion with high strength requirements, such as chassis elements, tanks, crash boxes, frame side members, brake disks, or clutches.

Figure 2A:
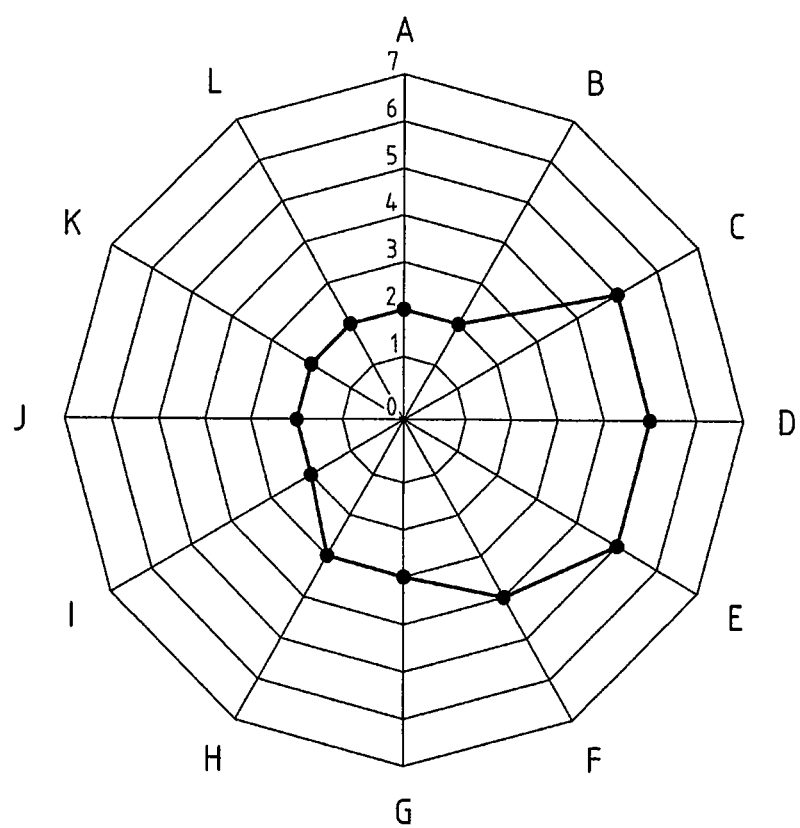
Figure 2B:
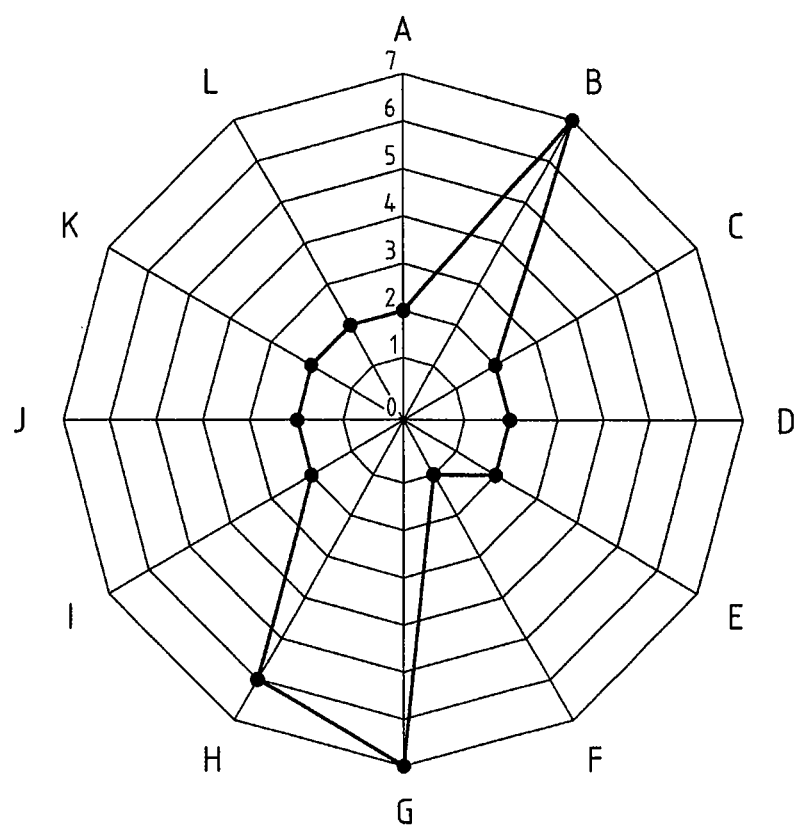
Figure 2C:
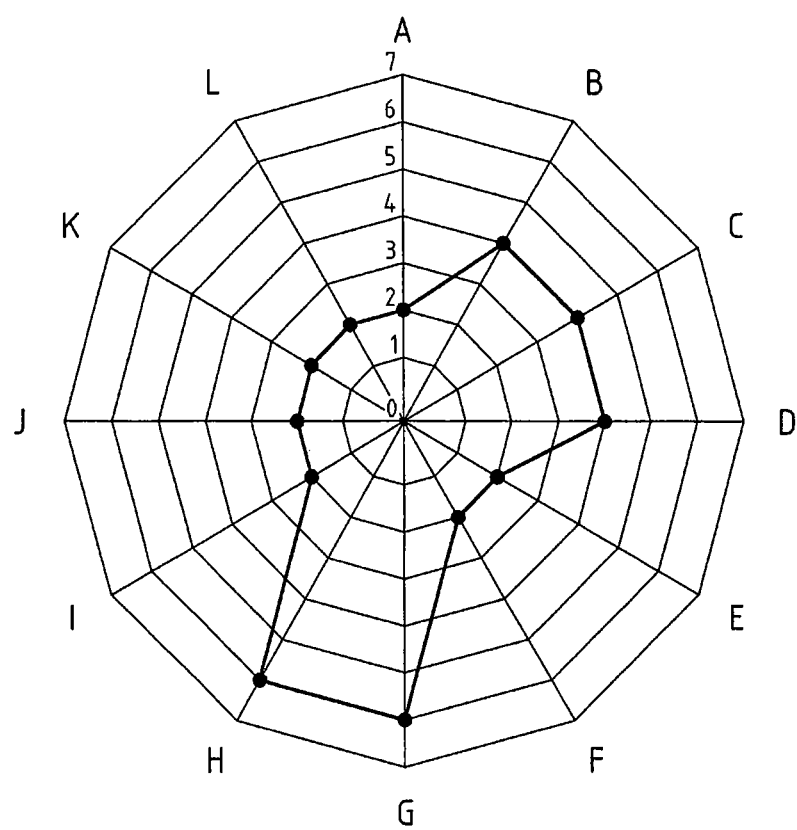

In the properties diagrams, which are shown in FIGS. 2*a-c*, it is shown how the properties of individual steel materials are changed in combination with other steel materials to provide the properties of a steel composite material. The degrees are indicated in stages from "0" to "7". "0" means essentially that the property is scarcely present. "7" means, by contrast, that the property is very heavily marked. There are twelve properties represented in the diagrams by capital letters. The letters stand for:

A: Surface quality,
B: Suitability for joining,
C: Energy conversion capacity for large deformations,
D: Energy conversion capacity for small deformations,
E: Notch sensitivity,
F: Susceptibility to hydrogen-induced crack formation,
G: Deformation capability,
H: Ductility,
I: Reduction of friction,
J: Improvement in protection against corrosion,
K: Resistance to media,
L: Resistance to heat.

In the property diagram shown in FIG. 2*a*, for example, the properties of a first steel material are represented, which is taken from the group of high-strength or, respectively, very high-strength steel alloys. It can be seen that the suitability for joining and the deformation capability are weak. The energy conversion capacity for large or, respectively, small deformations is strongly marked. The properties of ductility, notch sensitivity, susceptibility to hydrogen-induced crack formation, reduction of friction, improvement in protection against corrosion, resistance to media, resistance to heat, and surface quality, by contrast, are rather weakly marked.

In the property diagram shown in FIG. 2*b*, the properties of a second steel material are represented, taken from the group of soft, easily-deformable steel alloys. It can be seen that the suitability for joining, the deformation capability, and the ductility are very strongly marked. The properties of energy conversion capacity for large or, respectively, small deformations, notch sensitivity, susceptibility to hydrogen-induced crack formation, reduction of friction, improvement in protection against corrosion, resistance to media, resistance to heat, and surface quality, by contrast, are weakly or very weakly marked.

By the production of a composite material, the differently marked properties of the steel alloys represented in FIGS. 2*a* and 2*b* can be combined with one another or, respectively, supplement one another, such that a new property diagram results for such a composite material, which is shown in FIG. 2*c*. The composite material can, for example, have two outer layers of the high-strength or, respectively, very high-strength steel alloy known from FIG. 2*a*, and a middle layer of a steel alloy of a soft, easily-deformable steel alloy known from FIG. 2*b*. As can be seen from the diagram, the ductility and deformation capability of the composite material are very strongly marked. Also the energy conversion capacity for large or, respectively, small deformations and the suitability for joining show moderately high values. The remaining properties remain weakly marked. This is only one example of how, by means of a combination of steel alloys with different properties, a composite material can be created which has properties adapted to the subsequent use of the composite material. Thanks to the high and possibly variable requirement profile, such composite materials are especially well-suited for use in a motor vehicle structure, in particular a bodywork structure.

For the design of a B-column or comparable stabilising bodywork elements, the ductility and the deformation capability of the steel alloy of at least one of the layers should be perceptibly higher. This can be achieved by a combination of a micro-alloyed steel alloy, such as the type H340 LAD, as the material for the two outer layers, and a boron steel of the type 22MnB5 as the material of the middle layer. It is likewise possible, however, to conceive of a reverse arrangement, i.e. 22MnB5 on the outside and H340 LAD inside. The thickness of the outer layers amounts, for example, concordantly to 20% each of the total thickness, while by contrast the thickness of the middle layer accounts for 60% of the total thickness. The total thickness of the composite material in this example amounts to 2 mm. By means of this combination, a high strength and high ductility of the composite material can be guaranteed. In addition, such a composite material is particularly well-suited for joining processes in the structural work. Preferably, such a composite material can be hot-formed.

As an alternative, however, it is also possible for a boron steel of the type 22MnB5 to be combined, as the material for the outer layer, with a steel from the group of high-strength, highly ductile materials, such as FeMn steels (with 8 to 30% by weight of manganese, 0 to 1% by weight of carbon, 0 to 12% by weight of aluminum, 0 to 10% by weight of silicon, 0 to 10% by weight of chromium, 0 to 0.5% by weight of, individually or jointly, vanadium, titanium, niobium, boron; remainder iron and impurities) as the material for the middle layer. It is, however, likewise conceivable for a reverse arrangement to be used, i.e. 22MnB5 inside and high-strength, highly ductile steel material on the outside. The outer layers can have a thickness proportion of 30%, while by contrast the thickness of the middle layer amounts to about 40%. The processing of the composite material by means of hot deformation is particularly preferred. With this steel alloy combination, a very high degree of strength and perceptibly increased ductility can be attained.

For the design of structure components in the force flow or gusset plates, the suitability for joining in the steel alloy or alloys of the outer layers should have a higher level. In particular, the combination of very high-strength, cold-formable steel alloys with soft, ductile steel alloys is well-suited for processing with the cold deformation technique for complex geometries. As an example of a suitable layer design, reference can be made to an outer layer of a DC04 steel alloy, a middle layer of a complex phase steel alloy of the type CP-W, and a further outer layer of a DC04 steel alloy. A reverse arrangement is likewise conceivable, however, i.e. CP-W outside and DC04 inside. The thicknesses of the outer layers can amount to 25% of the total thickness each. The thickness of the middle layer in this example accounts for about 50% of the total thickness of the composite material. By way of this combination an optimum deformation behavior is achieved, in particular with very complex components. The strength of the composite material can thereby amount to around 500 MPa. The composite material has high ductility and good operational strength, and, in addition, is particularly well-suited for joining processes.

For the design of seat rails, hinges, or guide elements, the wear behavior of the steel alloys, in particular of the outer layers, must be perceptibly increased. In order to obtain a composite material with advantageous friction properties, as is required in particular for use in seat rails, hinges, or guide elements, a combination of a medium-strength material as the material of the middle layer with an extremely hard (high-strength) material as the material of the outer layer, which has a reduced friction resistance at the surfaces, in particular in the mixed friction range, is preferred. The outer layers can have a thickness of 10% of the total thickness each, and the middle layer of 80% of the total thickness. The steel alloys are preferably selected in such a way that a high strength and high ductility are achieved in the composite material, in particular in the core, and a reduced surface friction in the mixed friction region. It is further possible to select as the material for the middle layer a ductile steel alloy, and as the material of the outer layers a steel alloy which has a high resistance to wear. In this way an increased resistance to wear can be attained. It is thereby also possible for the noise level occurring during friction situations to be kept low.

For the design of components subject to corrosion risk, with high strength requirements, such as chassis elements or tanks, the corrosion behavior of the steel alloys should have a perceptibly higher level. A combination of high-strength cold-formable steel alloys with FeMn steels in the cold deformation process for complex geometries can be attained, for example, by two outer layers of a ferrite-bainite phase steel of the FB-W 600 type and a middle layer of an FeMn steel, wherein the thickness of the outer layers amounts concordantly to 30% of the total thickness. In this way a very good deformation behavior can be attained, which is particularly advantageous for the formation of very complex component geometries. By the combination of an FeMn steel with a steel alloy of the type FB-W 600, comparatively high strength values of about 700 MPa can be achieved. Such a composite material is further characterized by its high ductility, good operational strength, reduced notch sensitivity, reduced costs due to material and manufacture, and good joining suitability.

For the design of crash boxes or frame side members, the energy absorption of the steel alloy or alloys should be perceptibly higher in all layers.

For the design of brake disks or clutches, the deformation capability and hot strength of the steel alloy or alloys should be perceptibly higher in all layers. It may also be advantageous if the coating application capacity and surface properties of the steel alloys of the outer layers are more strongly marked.

In the examples referred to heretofore, the thicknesses of the outer layers are in each case the same. This is not essential, however. It can be advantageous, for example, for the purpose of process reliability, for an outer layer to be provided with a thickness greater in comparison with the second outer layer, for example if this thicker outer layer is subjected to welding processes in the course of further processing. Moreover, the total thickness of the composite materials in the examples given heretofore lies preferably between 0.8 and 2.5 mm. It is also possible, however, for a lower total thickness to be selected, such as 0.5 mm, or for a higher total thickness, such as 10.0 mm.

The invention claimed is:
1. A motor vehicle structure comprising a coilable multi-layer metallic composite material produced by means of roll-cladding
   wherein the composite material is a lightweight composite material, and consist of three layers made of a steel alloy,
   wherein at least one of the outer layers of the three layers is formed from a high-strength or very high-strength steel alloy, with a yield strength of more than 300 MPa and an elongation $A_{80}$ of less than 35%, wherein the motor vehicle structure is a B-column, a structural component in the force flow, a gusset plate, a seat rail, a lock, a hinge, a guide element, a chassis, a tank, a crash box, a frame side member, a brake disk or a clutch.

2. A motor vehicle structure according to claim 1, wherein a middle layer of the three layers is formed from a soft, easily-deformable steel alloy with a yield strength of less than 300 MPa and an elongation $A_{80}$ of more than 50%.

3. A motor vehicle structure according to claim 1, wherein all three layers are formed from steel alloys which differ from one another.

4. A motor vehicle structure according to claim 1, wherein the two outer layers of the three layers consist of the same high-strength or very high-strength steel alloy.

5. A motor vehicle structure according to claim 1, wherein the composite material has on at least one side metallic and/or organic coating.

6. A motor vehicle structure according to claim 1, wherein the composite material is cold-formed and/or hot-formed.

7. A motor vehicle structure according to claim 1, wherein a thickness of the middle layer of the three layers amounts to a maximum of 90% of a total thickness of the composite material.

8. A motor vehicle structure according to claim 1, wherein a thickness of the middle layer of the three layers amounts to at least 30% of a total thickness of the composite material.

9. A motor vehicle structure according to claim 1, wherein a total thickness of the composite material is at most 10.0 mm.

10. A motor vehicle structure according to claim 1, wherein thicknesses of at least two of the three layers are the same.

* * * * *